(12) United States Patent
Lee et al.

(10) Patent No.: US 8,175,456 B2
(45) Date of Patent: May 8, 2012

(54) BURST SCHEDULING METHODS IN OPTICAL BURST SWITCHING SYSTEM

(75) Inventors: Seoung Young Lee, Daejeon-Shi (KR); Yong Suk Lee, Daejeon-Shi (KR); Hong Shik Park, Daejeon-Shi (KR)

(73) Assignee: ICU Research & Industrial Cooperation Group (KR)

( * ) Notice: Subject to any disclaimer, the term of this patent is extended or adjusted under 35 U.S.C. 154(b) by 1007 days.

(21) Appl. No.: 11/977,912

(22) Filed: Oct. 26, 2007

(65) Prior Publication Data

US 2008/0285975 A1    Nov. 20, 2008

(30) Foreign Application Priority Data

May 14, 2007   (KR) .................. 10-2007-0046367

(51) Int. Cl.
*H04J 14/00* (2006.01)
*H04L 12/28* (2006.01)

(52) U.S. Cl. ............... 398/54; 398/57; 370/431

(58) Field of Classification Search ............ 398/46, 398/47, 51, 52, 54, 57; 370/406, 431
See application file for complete search history.

(56) References Cited

U.S. PATENT DOCUMENTS

| | | | |
|---|---|---|---|
| 5,258,868 A | 11/1993 | Jensen et al. | |
| 6,091,740 A * | 7/2000 | Karasawa | ............ 370/458 |
| 6,154,462 A | 11/2000 | Coden | |
| 6,285,808 B1 | 9/2001 | Mehlhorn | |
| 6,755,575 B2 | 6/2004 | Kronlund et al. | |
| 6,788,681 B1 | 9/2004 | Hurren et al. | |
| 6,898,205 B1 * | 5/2005 | Chaskar et al. | ............ 370/450 |
| 6,963,575 B1 | 11/2005 | Sistanizadeh et al. | |
| 7,305,156 B2 | 12/2007 | Mohammed | |
| 7,436,784 B2 | 10/2008 | Hashimoto | |
| 7,441,965 B2 | 10/2008 | Furuno et al. | |
| 7,564,779 B2 | 7/2009 | Rose et al. | |
| 7,606,240 B1 | 10/2009 | Shah | |
| 7,712,976 B2 | 5/2010 | Aronson et al. | |
| 7,733,807 B2 | 6/2010 | Takefman | |
| 2003/0185484 A1 | 10/2003 | Chakravorty et al. | |
| 2004/0170184 A1 | 9/2004 | Hashimoto | |
| 2005/0135379 A1 | 6/2005 | Callaway et al. | |
| 2006/0098571 A1 | 5/2006 | Takefman | |

(Continued)

FOREIGN PATENT DOCUMENTS

KR    10-2001-0016359 A    5/2001

(Continued)

OTHER PUBLICATIONS

U.S. Appl. No. 11/977,912, Seoung Young Lee.

(Continued)

*Primary Examiner* — Nathan Curs
(74) *Attorney, Agent, or Firm* — Wells St. John P.S.

(57) ABSTRACT

Provided is a burst scheduling method in an Optical Burst Switching (OBS) system in which a plurality of nodes are connected through a mesh-type network. When a TDB which has used many network resources via a plurality of nodes and an SHG burst generated in a previous node, among bursts including BCPs transmitted from the previous node, compete in a current node so as to occupy a specific output channel, scheduling is performed to cause the TDB to have a higher priority than the SHG burst such that the corresponding output channel is occupied. Therefore, it is possible to minimize a burst loss in a network node, thereby enhancing the overall system performance.

7 Claims, 3 Drawing Sheets

U.S. PATENT DOCUMENTS

| | | | |
|---|---|---|---|
| 2006/0153218 A1* | 7/2006 | Shakhov | 370/431 |
| 2006/0263012 A1 | 11/2006 | Yamazaki | |
| 2007/0008964 A1 | 1/2007 | Rose et al. | |
| 2007/0177588 A1* | 8/2007 | Lee et al. | 370/389 |
| 2007/0258683 A1 | 11/2007 | Rolston et al. | |
| 2008/0095047 A1 | 4/2008 | Skalecki et al. | |
| 2008/0130490 A1 | 6/2008 | Yu et al. | |
| 2008/0285975 A1 | 11/2008 | Lee et al. | |

FOREIGN PATENT DOCUMENTS

| | | |
|---|---|---|
| KR | 10-2001-0096855 A | 11/2001 |
| KR | 1020040089014 A | 10/2004 |
| KR | 10200504564 A | 5/2005 |
| KR | 10200504564 A | 5/2005 |
| KR | 10-2007-0097998 | 9/2007 |

OTHER PUBLICATIONS

Coin Acoft 2007 Conference; Jun. 24-27, 2007; Managed FDB Algorithim and Protection in Ehternet Ring topology; Kinsung Im, Jeondong Ryooo*, K. Kevin Rhee.

Coin Acoft; 2007 Conference; Jun. 27, 2007.

Steenberge et al, "MT-Compatible Laser-Ablated Interconnections for Optical Printed Circuit Boards" Journal of Lightwave Technology, vol. 22, No. 9, Sep. 2004, pp. 2083-2090.

* cited by examiner

BURST SCHEDULING METHODS IN OPTICAL BURST SWITCHING SYSTEM

CROSS REFERENCE TO RELATED PATENT APPLICATION

This U.S. patent application relates to and claims priority to corresponding Korean Patent Application No. 10-2007-0046367, which was filed on May 14, 2007, and the entire disclosure is incorporated herein by reference.

BACKGROUND OF THE INVENTION

1. Field of the Invention

The present invention relates to a burst scheduling method in an Optical Burst Switching (OBS) system, and more specifically, to a burst scheduling method in an OBS system which grants a high priority to a burst which has used many network resources, such that fairness between bursts can be guaranteed in an OBS system having a mesh-type network. Therefore, it is possible to minimize a burst loss in a network node, thereby enhancing the overall system performance.

2. Description of Related Art

In general, when a burst is generated in Optical Burst Switching (OBS) networks, a Burst Control Packet (BCP) is transmitted first. Then, a Data Burst (DB) for transmitting data is transmitted after a predetermined time. Such a time difference is referred to as an offset time.

A conventional burst scheduling method in the OBS is designed in such a manner that a burst transmitted to the next node via a current node, that is, a Transit Data Burst (TDB) and a burst leaving at the current node attempt to occupy an output channel at the same time such that a burst having a larger offset time can occupy the output channel.

In a mesh-type network, however, various offset times are provided depending on the number of nodes through which a burst should pass so as to arrive at its destination node. Therefore, even bursts having the same priority have a different offset time, which is a cause of obstructing fairness between bursts. Thus, an improvement therefor is needed.

To solve such a problem, a method is proposed in which bursts arriving at a destination node via a plurality of nodes, that is, Several Hop Going (SHG) bursts, are transmitted to the next node using a dedicated wavelength, and bursts in which the destination node is the next node, that is, One Hop Going (OHG) bursts, are inserted between bursts which are transmitted from the previous node and are survived in competition, that is, Transit Data Bursts (TDBs), and are then transmitted.

Such a conventional method can enhance the performance of the OHG burst, but does not present a process of enhancing the performance of the SHG burst, which is transmitted from the previous node and is then transmitted to the next node. Thus, an improvement therefore is needed.

Meanwhile, a ratio of OHG traffic in the overall traffic of the OBS is about 1/N. In order to enhance system performance, a loss of TDB or SHG burst should be reduced.

SUMMARY OF THE INVENTION

An advantage of the present invention is that it provides a burst scheduling method in an Optical Burst Switching (OBS) system, which grants a high priority to a TDB which has used many network resources (for example, wavelength, usage time and the like) via a plurality of nodes and grants a low priority to an SHG burst generated in a previous node, thereby enhancing the overall system performance.

According to an aspect of the present invention, a burst scheduling method in an OBS system, in which a plurality of nodes are connected through a mesh-type network, includes: (a) determining, using a Burst Control Packet (BCP) transmitted from a previous node, whether an input burst is a Transit Data Burst (TDB) or an Several Hop Going (SHG) burst; (b) when the input burst is a TDB as a determination result of step (a) and an output channel to be used is already occupied by a specific SHG burst, reassigning the corresponding output channel such that the corresponding burst occupies the output channel; and (c) when the input burst is an SHG burst as a determination result of step (a) and an output channel to be used is already occupied by another burst, discarding the corresponding burst.

In step (b), when the output channel to be used is occupied by another TDB, the corresponding burst may be discarded.

In step (b), when the output channel to be used is available, the corresponding burst may occupy the output channel.

In step (b), the output channel occupied by the SHG burst may be removed, and a retransmission request signal may be transmitted to the previous node such that the corresponding SHG burst can be retransmitted.

In step (c), when the output channel to be used is available, the corresponding burst may occupy the output channel.

In step (c), when the corresponding burst is discarded, a retransmission request signal may be transmitted to the previous node such that the corresponding burst is retransmitted.

According to another aspect of the present invention, there is provided a burst scheduling method in an OBS system in which a plurality of nodes are connected through a mesh-type network. When a TDB which has used many network resources via a plurality of nodes and an SHG burst generated in a previous node, among bursts including BCPs transmitted from the previous node, compete in a current node so as to occupy a specific output channel, scheduling is performed to cause the TDB to have a higher priority than the SHG burst such that the corresponding output channel is occupied.

According to still another aspect of the present invention, there is provided a computer readable recording medium having a program capable of executing any one method of the above-described aspects on a computer.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION OF EXEMPLARY EMBODIMENTS

Hereinafter, an exemplary embodiment of the present invention will be described in detail with reference to the accompanying drawings.

Figure 1:
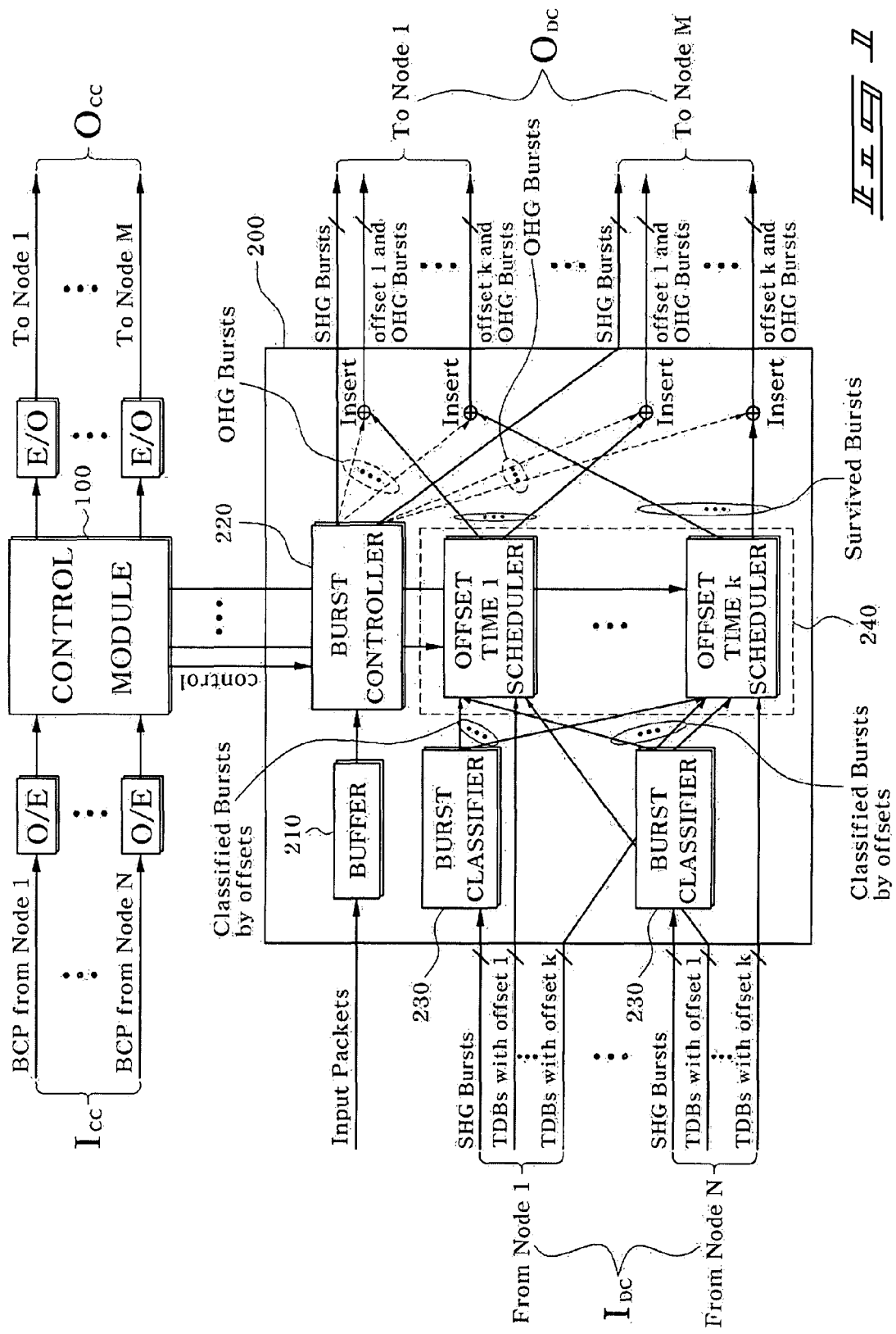
FIG. 1 is a block diagram showing the configuration of an optical burst switch for implementing a burst scheduling method in an Optical Burst Switching (OBS) system according to an exemplary embodiment of the present invention.

FIG. 1 is a block diagram showing the configuration of an optical burst switch for implementing a burst scheduling method in an OBS system according to an exemplary embodiment of the present invention. Specifically, FIG. 1 shows the configuration of the optical burst switch for guaranteeing fairness between bursts having the same priority.

Referring to FIG. 1, the optical burst switch for implementing the burst scheduling method in an OBS system according to an exemplary embodiment of the present invention includes a control module 100 for processing signals and a burst processing module 200 for processing burst payloads.

The control module 100 decodes a Burst Control Packet (BCP) inputs through an input control channel Icc so as to secure routing information on an offset time of a burst arriving after the offset time and the size of the burst. Based on the routing information, the control module 100 determines channel occupation of an arriving burst.

The BCP processed by the control module 100 is subjected to optical-to-electric (O/E) and electric-to-optical (E/O) conversion through an O/E conversion section and an E/O conversion section which are connected to an input control module Icc and an output control module Occ of the control module 100, respectively.

That is, the O/E conversion section serves to convert BCPs into an electrical signal from an optical signal, the BCPs being input through the input control channel Icc of each node.

The E/O conversion section serves to convert BCPs into an optical signal corresponding to an available output resource from an electrical signal, the BCPs being output through the output control channel Occ of each node.

On the other hand, bursts transmitted through input and output data channels $I_{DC}$ and $O_{DC}$ are not subjected to the O/E and E/O conversions, and are converted into the next node. Because of such a difference, offset time is generated.

Further, the burst processing module 200 serves to perform the overall processing including generating, classifying, and scheduling bursts. The burst processing module 200 serves to switch the input data channel $I_{DC}$ into the output data channel $O_{DC}$ such that a burst can be delivered to a desired destination node according to routing information on the BCP secured by the control module 100.

The burst processing module 200 includes a buffer 210, a burst controller 220, a burst classifier 230, and a plurality of burst schedulers 240.

The buffer 210 serves to store input packets in a queue for a predetermined time.

The burst controller 220 is connected to an output end of the buffer 210. When the total length of packets staying in the queue of the buffer 210 exceeds a preset critical value, the burst controller 220 generates bursts. Further, the burst controller 220 receives a predetermined control signal output from the control module 100 and classifies the generated bursts, depending on a destination node. Then, the burst controller 220 performs scheduling such that the classified bursts are transmitted through different methods from each other.

In other words, bursts of which the destination node is the right next node, that is, OHG (one hop going) bursts, are transmitted to the next node using an empty space between survived bursts. In this case, since the destination node is the next node, BCPs are not needed.

On the other hand, when bursts should pass through a plurality of nodes so as to arrive at their destination nodes, BCPs are needed. In this case, the bursts are transmitted to the next node using a dedicated wavelength. Since the bursts using the dedicated wavelength have various offset times, scheduling is performed so that bursts do not conflict with each other. Such bursts are referred to as SHG (Several Hop Going) bursts.

The burst classifier 230 is connected to the input data channel $I_{DC}$ of each node. The burst classifier 230 separates SHG bursts, transmitted to the next node without a collision between bursts in the previous node, according to each offset time and then transmits the separated SHG bursts to the burst scheduler 240.

The burst scheduler 240 is provided for each of the offset times 1 to k. In addition to the SHG bursts transmitted from the burst classifier 230, bursts which are input to the current node through a competition process in the previous node, that is, TDBs (Transit Data Bursts) are simultaneously input to the burst schedulers 240. Since the TDBs have the same offset time and use a dedicated wavelength for transmission to the next node, fairness is guaranteed between the bursts.

The burst scheduler 240 performs scheduling such that a TDB and an SHG burst which are input at the same time have a different priority from each other. That is, when a TDB which has used many network resources via a plurality of nodes and an SHG burst generated in the previous node compete with each other to occupy an output data channel $O_{DC}$ to be used, the burst scheduler 24 performs scheduling so as to cause the TDB to have a higher priority than the SHG burst such that the corresponding output data channel $O_{DC}$ is occupied.

The reason why the TDB is caused to have a different priority from the SHG burst is that the TDB has used many network resources, but the SHG burst generated in the previous node has used few network resources. Therefore, when the TDB burst has a higher priority, it is possible to enhance the overall system performance.

Meanwhile, the above-described optical burst switch applied to an exemplary embodiment of the present invention has both an edge node function and a core node function and can provide fairness.

Figure 2:
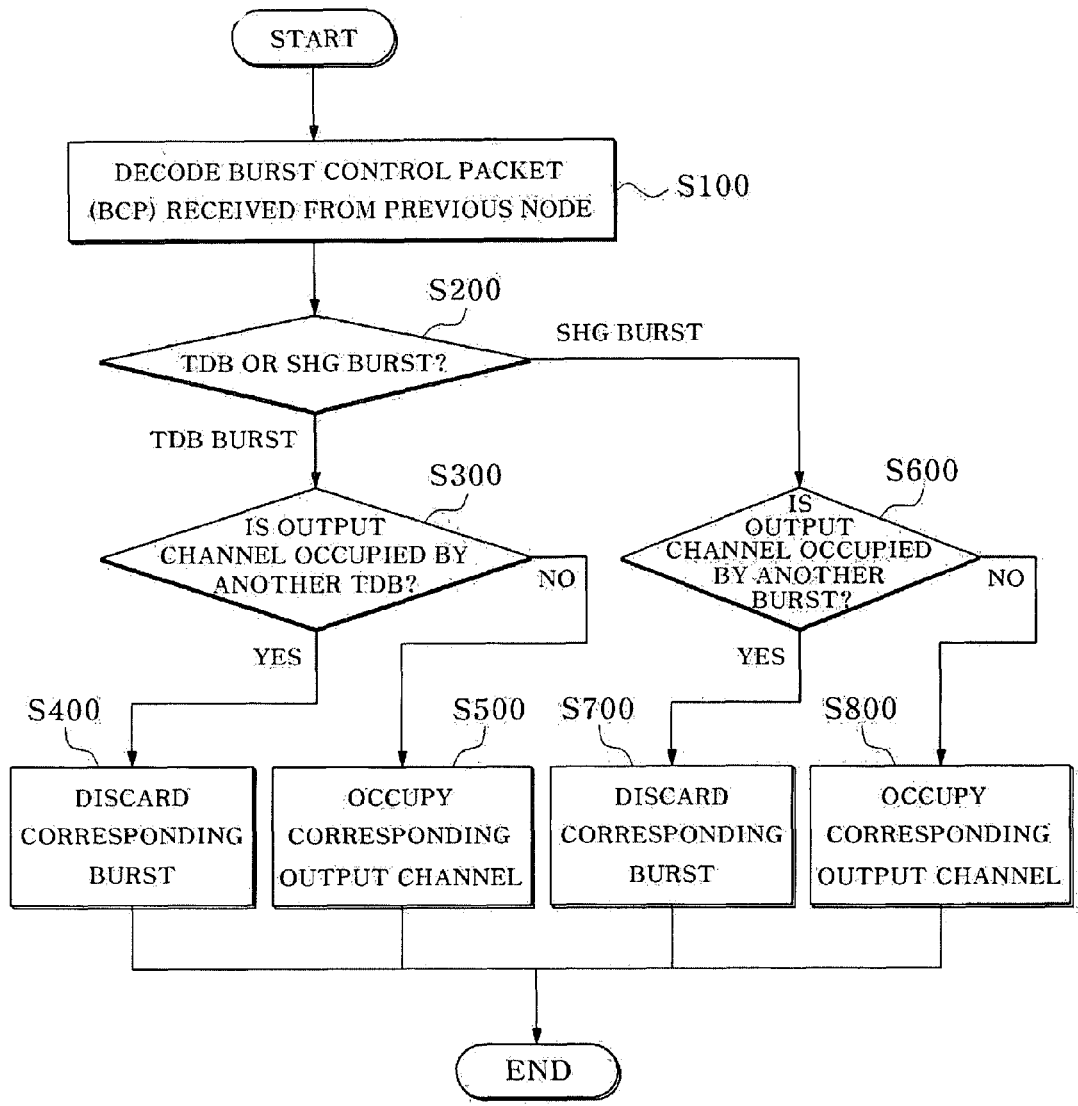
FIG. 2 is a flow chart illustrating a burst scheduling method in an OBS system according to an exemplary embodiment of the present invention.

FIG. 2 is a flow chart illustrating a burst scheduling method in an OBS system according to an exemplary embodiment of the present invention. As long as no specific explanation is given, it is assumed that the burst scheduling method is performed by the burst scheduler 240 as a main operating body.

Referring to FIG. 2, a BCP received in the previous node is decoded (S100), and it is determined whether an input burst is a TDB or an SHG burst (S200).

When it is determined at step S200 that the input burst is a TDB, it is checked whether an output channel to be used is already occupied by another TDB (S300). If the output channel is occupied by another TDB, the corresponding burst is discarded (S400). Otherwise, if the output channel is occupied by a specific SHG burst, the output channel occupied by the specific SHG burst is removed, and an output channel is reassigned to the TDB. On the other hand, if the output channel is not used, that is, when the output channel is available, the TDB occupies the output channel (S500).

When it is determined at step S200 that the input burst is an SHG burst, it is checked whether an output channel to be used is already occupied by another burst (TDB or SHG burst) (S600). If the output channel is occupied by another burst, the corresponding burst is discarded (S700). Otherwise, when the output channel is available, the corresponding output channel is occupied by the SHG burst (S800).

As described above, the scheduling is performed such that different priorities are granted to all received bursts. Therefore, it is possible to enhance the overall system performance.

When a system is implemented using the burst scheduling method in an OBS system according to an exemplary embodiment of the present invention, there is a problem that a loss ratio of SHG bursts which are initially input to the OBS system increases.

That is, if an output channel is occupied through one competition, an SHG burst can be delivered to its destination node without loss. However, it happens that the SHG burst loses in competition with the TDB.

In the present invention, to solve such a problem, the lost SHG bursts are retransmitted. The reason why the lost SHG bursts are retransmitted is that, since the retransmission of the SHG bursts is achieved by transmitting a retransmission signal to the previous node, it does not take a long time and the retransmission is simply implemented. On the other hand, when all the bursts are retransmitted, the implementation is complicated and retransmission signals are transmitted to all the nodes, and thus the retransmission cannot be performed at a desired time.

Figure 3:
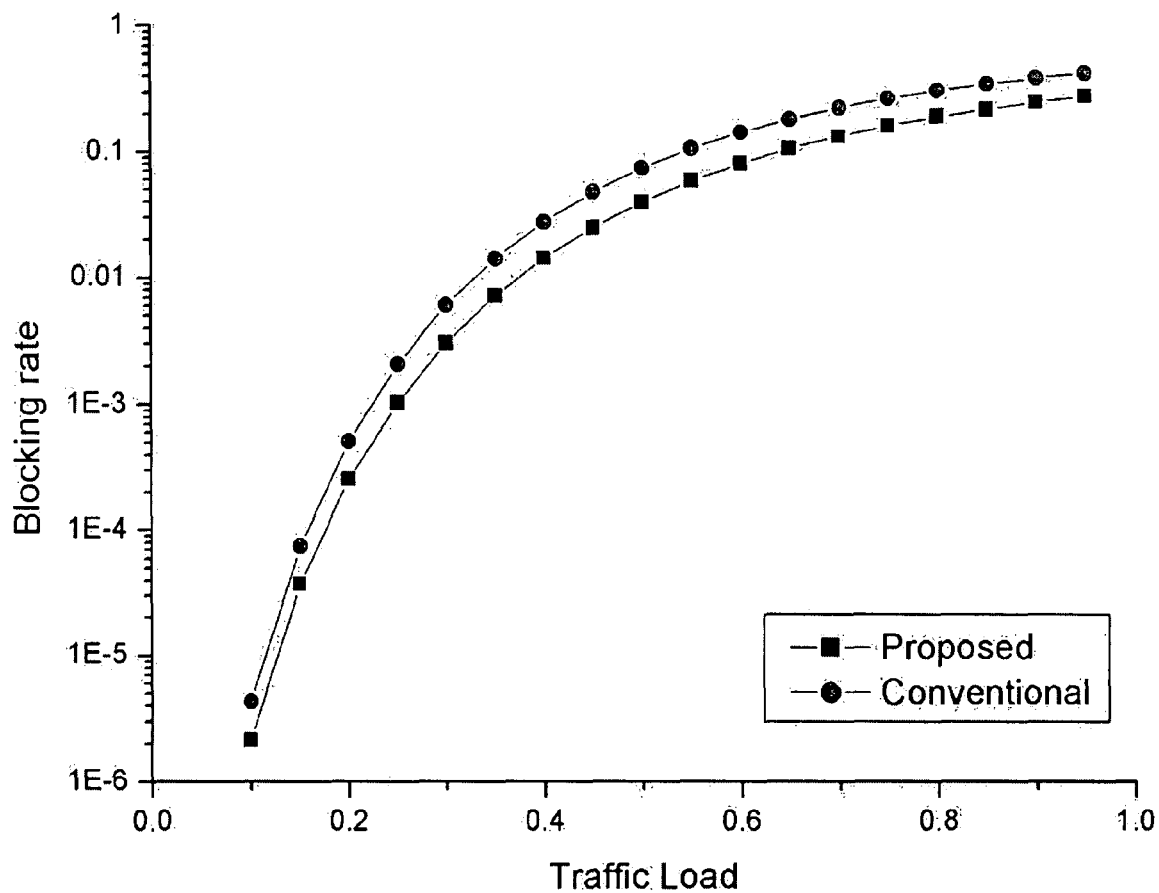
FIG. 3 is a graph showing a blocking rate according to a traffic load to compare the performance of the burst scheduling method of the present invention with the performance of a conventional burst scheduling method.

FIG. 3 is a graph showing a blocking rate according to a traffic load to compare the performance of the burst scheduling method of the present invention with the performance of a conventional burst scheduling method. FIG. 3 shows a result where the performances are mathematically analyzed.

Referring to FIG. 3, the number of nodes used for the performance analysis is set to 4, the number of offset times is set to 8, and the number of output wavelengths is set to 4.

As shown in FIG. 3, it can found that a burst loss decreases when scheduling is performed by the method proposed in the present invention, compared with the conventional method.

Meanwhile, the burst scheduling method in the OBS system according to an exemplary embodiment of the present invention can be implemented in a computer readable recording medium as a computer readable code. The computer readable recording medium includes every kind of recording device in which data read by a computer system is stored.

As for the computer readable recording medium, provided are a ROM, a RAM, a CD-ROM, a magnetic tape, a hard disk, a floppy disk, a portable storing device, a non-volatile flash memory, an optical data storing device and the like. Further, a medium implemented in the form of carrier wave (for example, transmission through the Internet) is also included.

Further, the computer readable recording medium can be stored and executed as codes which can be distributed to computer systems connected through a computer communication network and can be read through a distribution method.

According to the above-described burst scheduling method in an OBS system, a high priority is granted to a burst which has used many network resources such that fairness can be guaranteed between bursts in an OBS system having a mesh-type network. Therefore, a burst loss can be minimized in network nodes and the overall system performance can be enhanced.

Further, to solve such a problem where a loss ratio of SHG bursts generated in a node prior to a current node is high, the lost SHG bursts are retransmitted, and thus the overall system throughput is enhanced.

While the burst scheduling method in an OBS system according to the present invention has been described with reference to exemplary embodiments thereof, it will be understood by those skilled in the art that various changes and modifications in form and detail may be made therein without departing from the scope of the present invention as defined by the following claims.

What is claimed is:

1. A computer program encoded on a non-transitory computer readable medium comprising a burst scheduling method in an Optical Burst Switching (OBS) system in which a plurality of nodes are connected through a mesh-type network, the method comprising:
    (a) determining, using a Burst Control Packet (BCP) transmitted from a previous node, whether an input burst is a Transit Data Burst (TDB) or an Several Hop Going (SHG) burst;
    (b) when the input burst is a TDB as a determination result of step (a) and an output channel to be used is already occupied by a specific SHG burst, reassigning the corresponding output channel such that the corresponding TDB burst occupies the output channel; and
    (c) when the input burst is an SHG burst as a determination result of step (a) and an output channel to be used is already occupied by another burst, discarding the corresponding SHG burst.

2. The burst scheduling method according to claim 1 further comprising when the output channel to be used is occupied by another TDB in step (b), the corresponding input TDB burst is discarded.

3. The burst scheduling method according to claim 1 further comprising when the output channel to be used is available in step (b), the corresponding burst occupies the output channel.

4. The burst scheduling method according to claim 1, wherein in step (b), if the output channel is occupied by the SHG burst, the SHG burst is removed from the output channel before the reassigning, and a retransmission request signal is transmitted to the previous node such that the corresponding SHG burst is retransmitted.

5. The burst scheduling method according to claim 1 further comprising in step (c), when the output channel to be used is available, the corresponding SHG burst occupies the output channel.

6. The burst scheduling method according to claim 1, wherein in step (c), when the corresponding SHG burst is discarded, a retransmission request signal is transmitted to the previous node such that the corresponding SHG burst is retransmitted.

7. A computer program encoded on a non-transitory computer readable medium comprising a burst scheduling method in an Optical Burst switching (OBS) system in which a plurality of nodes are connected through a mesh-type network, further comprising when a TDB which has used many network resources via a plurality of nodes and an SHG burst generated in a previous node, among bursts including BCPs transmitted from the previous node, compete in a current node so as to occupy a specific output channel, scheduling is performed to cause the TDB to have a higher priority than the SHG burst such that the corresponding output channel is occupied.

* * * * *